(12) United States Patent
Bergholz

(10) Patent No.: US 7,607,307 B2
(45) Date of Patent: Oct. 27, 2009

(54) METHODS AND APPARATUS FOR CONTROLLING COOLING AIR TEMPERATURE IN GAS TURBINE ENGINES

(75) Inventor: Robert Frederick Bergholz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 518 days.

(21) Appl. No.: 11/327,623

(22) Filed: Jan. 6, 2006

(65) Prior Publication Data

US 2007/0157626 A1    Jul. 12, 2007

(51) Int. Cl.
*F02C 3/30* (2006.01)

(52) U.S. Cl. .................... 60/775; 60/39.3; 60/39.53; 415/116

(58) Field of Classification Search .............. 60/39.3, 60/39.53–39.55, 39.58–39.59, 806, 775; 415/114–116
See application file for complete search history.

(56) References Cited

U.S. PATENT DOCUMENTS

| | | | |
|---|---|---|---|
| 4,338,780 A * | 7/1982 | Sakamoto et al. ............. | 60/775 |
| 4,751,814 A | 6/1988 | Farrell | |
| 5,121,596 A * | 6/1992 | Takehara et al. .............. | 60/775 |
| 5,255,849 A * | 10/1993 | Mayer et al. ............. | 239/127.3 |
| 5,317,877 A | 6/1994 | Stuart | |
| 5,320,483 A * | 6/1994 | Cunha et al. ................. | 415/114 |
| 5,340,274 A | 8/1994 | Cunha | |
| 5,399,067 A * | 3/1995 | Yoshida ....................... | 415/115 |
| 6,058,695 A | 5/2000 | Ranasinghe et al. | |
| 6,233,937 B1 * | 5/2001 | Gray ........................... | 60/646 |
| 6,367,242 B1 * | 4/2002 | Uematsu et al. .......... | 60/39.182 |
| 6,553,753 B1 * | 4/2003 | Payling et al. ............. | 60/39.53 |
| 6,578,362 B1 | 6/2003 | Coffinberry | |
| 6,584,778 B1 | 7/2003 | Griffiths et al. | |
| 6,772,581 B2 * | 8/2004 | Ojiro et al. ................ | 60/39.182 |
| 6,935,831 B2 | 8/2005 | Joshi | |
| 6,978,623 B2 * | 12/2005 | Hyakutake et al. ............ | 60/806 |
| 7,131,813 B2 * | 11/2006 | Tiemann ...................... | 415/115 |
| 2002/0150467 A1 * | 10/2002 | Tanioka ...................... | 415/115 |

\* cited by examiner

*Primary Examiner*—Michael Cuff
*Assistant Examiner*—Phutthiwat Wongwian
(74) *Attorney, Agent, or Firm*—William Scott Andes, Esq.; Armstrong Teasdale LLP

(57) ABSTRACT

A cooling system for a gas turbine engine including a compressor, a combustor and a high-pressure turbine, coupled together in serial flow arrangement. The cooling system includes a storage tank, a working fluid stored within the storage tank, and a manifold coupled to the channel that supplies cooling air to the high pressure turbine. The working fluid is discharged from the manifold into the turbine cooling air supply channel, thereby reducing the temperature of the compressed cooling airflow channeled to the high pressure turbine.

14 Claims, 6 Drawing Sheets

_US 7,607,307 B2_

METHODS AND APPARATUS FOR CONTROLLING COOLING AIR TEMPERATURE IN GAS TURBINE ENGINES

BACKGROUND OF THE INVENTION

This invention relates generally to gas turbine engines, and more specifically to methods and apparatus for controlling cooling air temperature in gas turbine engines.

A gas turbine engine typically includes a multi-stage axial compressor, a combustor, and a turbine. Airflow entering the compressor is compressed and directed to the combustor where it is mixed with fuel and ignited, producing hot combustion gases used to drive the turbine. To control the heat transfer induced by the hot combustion gases entering the turbine, typically cooling air is channeled through a turbine cooling circuit and used to cool the turbine.

Compressor bleed air is often used as a source of cooling air for the turbine cooling circuit. Moreover, maintaining sufficient cooling air within the gas turbine engine is critical to proper engine performance and component longevity. However, during operation the temperature of air flowing through the compressor generally increases at each stage of the compressor. As a result, compressor discharge air temperature might be too high to adequately reduce the operational temperature of the gas turbine components to the desired temperature.

BRIEF DESCRIPTION OF THE INVENTION

In one aspect, a method for operating a gas turbine engine, including a compressor, a combustor and a high-pressure turbine, coupled together in serial flow arrangement is provided. The method includes channeling a working fluid into a cooling system manifold coupled to the duct that supplies cooling air to the high pressure turbine, discharging the fluid into the turbine cooling air supply duct, and thereby reducing the temperature of the compressed cooling airflow channeled to the high pressure turbine.

In another aspect, a cooling system for a gas turbine engine is provided. The cooling system includes a core gas turbine engine including a compressor, a combustor downstream from the compressor, and a high-pressure turbine downstream from the combustor, and a cooling system including a storage tank, a working fluid stored within the storage tank, and a manifold coupled to the duct that supplies cooling air to the high pressure turbine, the cooling system configured to discharge the working fluid from the storage tank into the manifold, and from the manifold into the turbine cooling air supply duct, to facilitate reducing the temperature of the compressed cooling airflow channeled to the high pressure turbine.

DETAILED DESCRIPTION OF THE INVENTION

Figure 1:
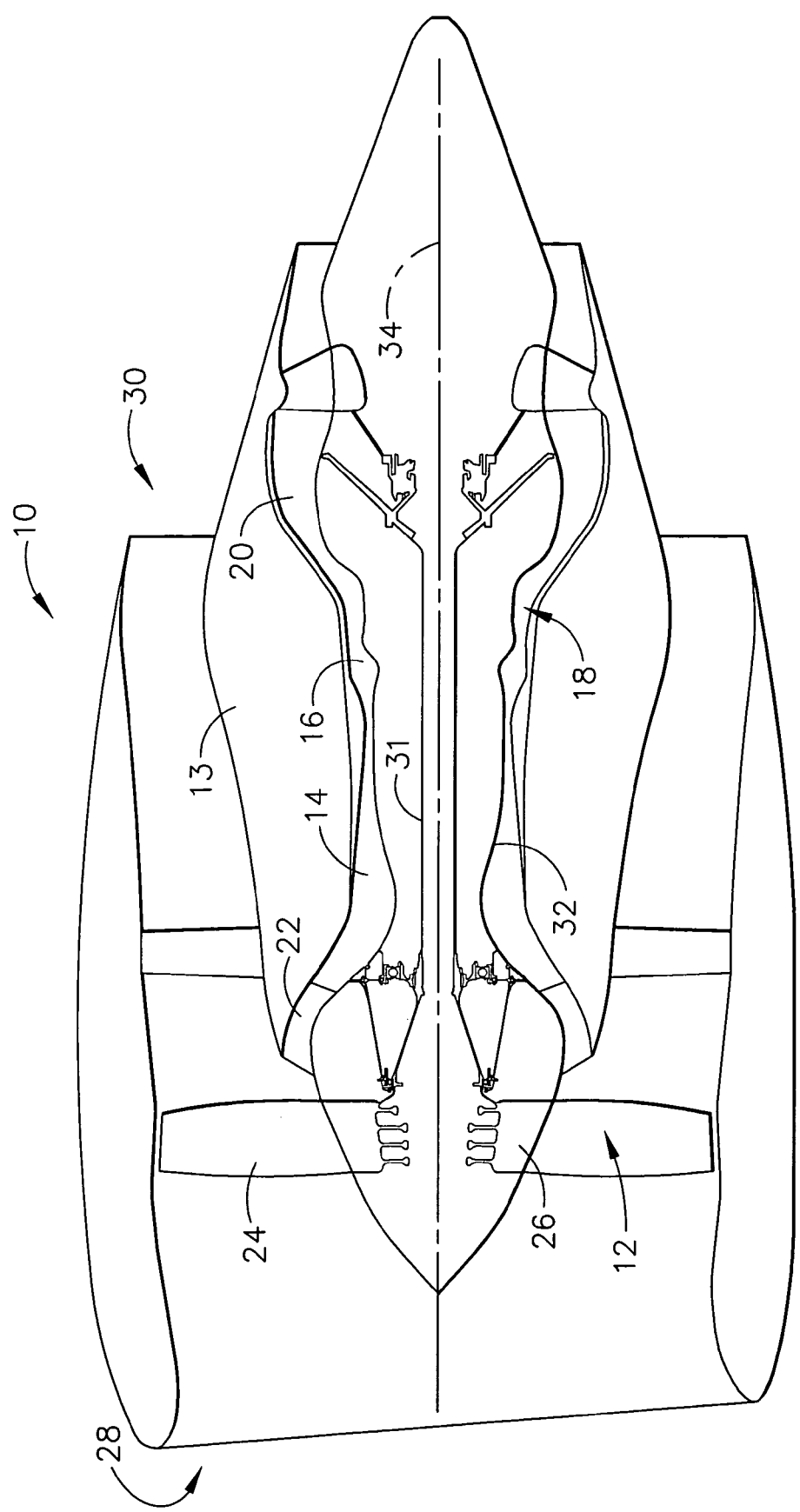
FIG. 1 illustrates an exemplary gas turbine engine.

Referring to the drawings, FIG. 1 is a schematic illustration of an exemplary gas turbine engine 10 that includes a fan assembly 12 and a core engine 13 including a high pressure compressor 14, and a combustor 16 and a high-pressure turbine. In the exemplary embodiment, engine 10 also includes a low pressure turbine 20 and a booster 22. Fan assembly 12 includes an array of fan blades 24 extending radially outward from a rotor disc 26. Engine 10 has an intake side 28 and an exhaust side 30. Fan assembly 12 and turbine 20 are coupled by a first rotor shaft 31, and compressor 14 and turbine 18 are coupled by a second rotor shaft 32.

During operation, air flows through fan assembly 12, along a central axis 34, and compressed air is supplied to high pressure compressor 14. The highly compressed air is delivered to combustor 16. Airflow (not shown in FIG. 1) from combustor 16 drives turbines 18 and 20, and turbine 20 drives fan assembly 12 by way of shaft 31.

Figure 2:
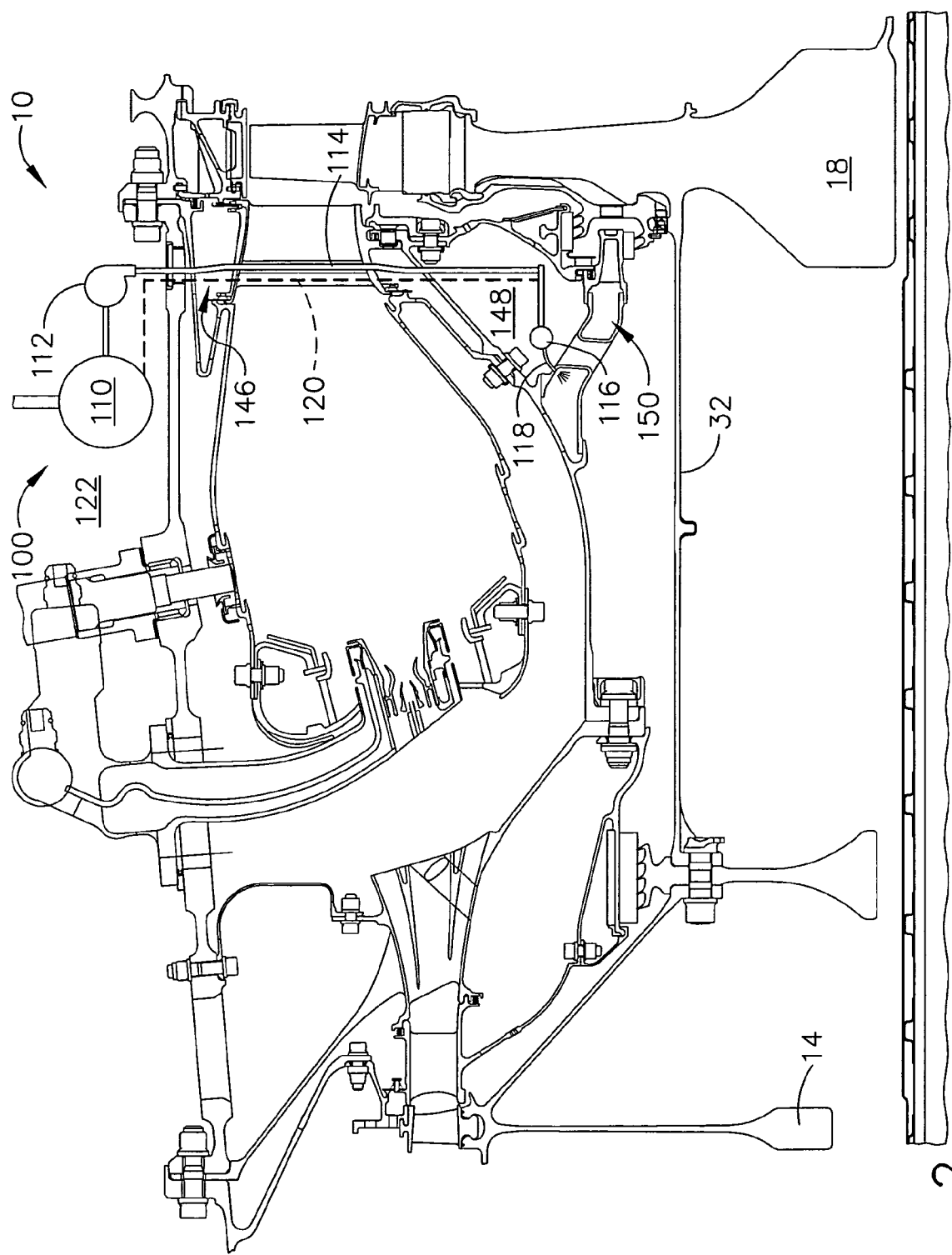
FIG. 2 is a schematic diagram of the exemplary gas turbine engine shown in FIG. 1 including an exemplary cooling system.
Figure 3:
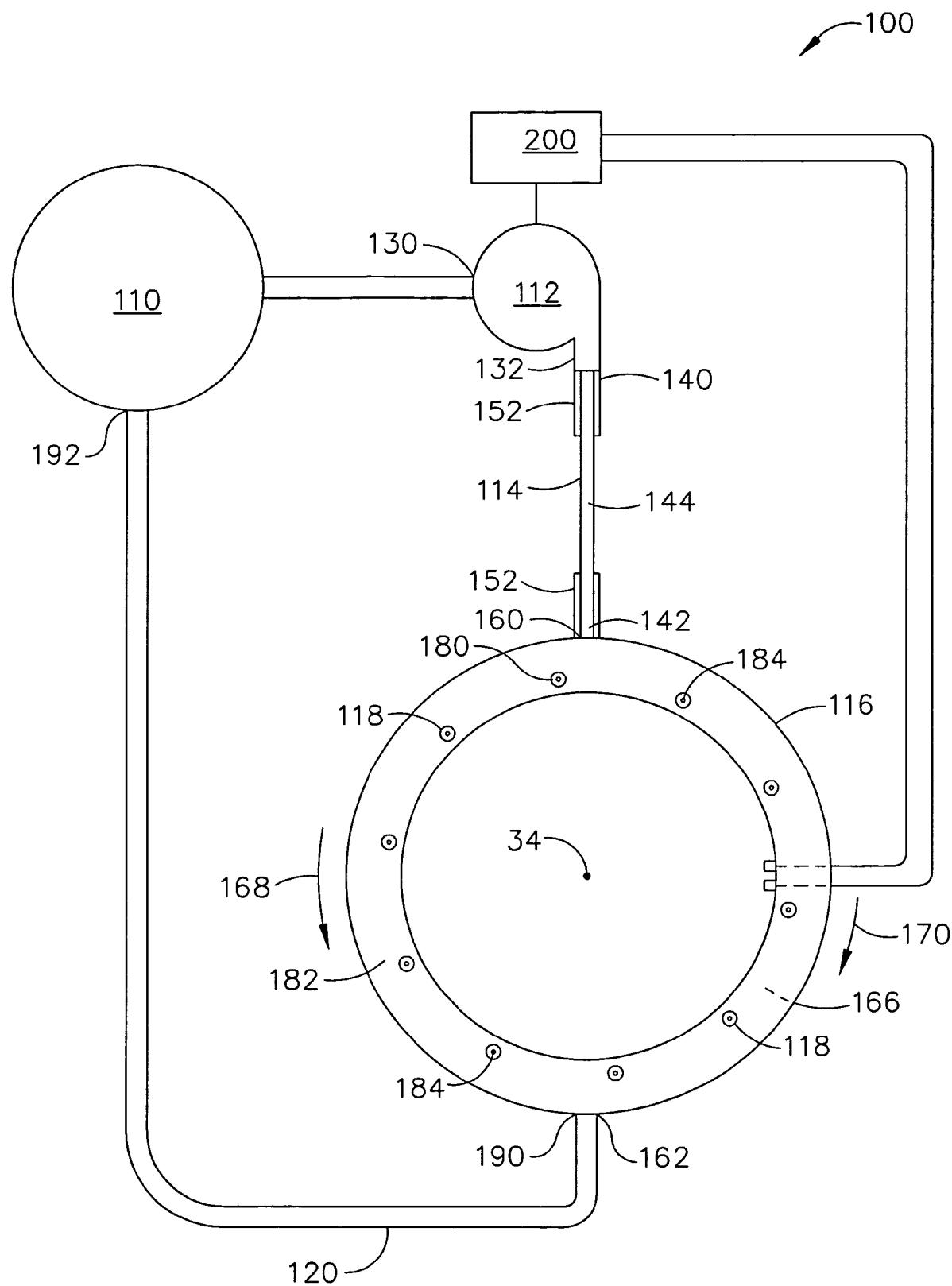
FIG. 3 is a view taken through section 3-3 of the cooling system shown in FIG. 2.

FIG. 2 is a schematic diagram of gas turbine engine 10 including an exemplary cooling system 100 that may be utilized to reduce the operating temperature of the cooling airflow channeled to a portion of the gas turbine engine 10 such as high pressure turbine 18, for example. FIG. 3 is a simplified schematic illustration of cooling system 100. The power output of engine 10 is at least partially related to the temperatures of the gas flow at various locations along the gas flow path. As a result, lowering the temperature of the cooling flow supplied to the high pressure turbine 18 can allow a reduction in the cooling flow and an increase in the power output of the engine 10. In addition, a reduction in cooling flow temperature to the turbine 18 can result in an increase in life of the turbine parts.

To facilitate lowering the temperature of the cooling air flow entering high pressure turbine 18, cooling system 100 is coupled in flow communication with airflow channeled from high pressure compressor 14 to high pressure turbine 18. More specifically, an operating temperature of the airflow discharged from high pressure compressor 14 is facilitated to be reduced prior to the airflow being channeled to high pressure turbine 18 utilizing cooling system 100.

In the exemplary embodiment, cooling system 100 includes a tank or reservoir 110, at least one pump 112 coupled in flow communication with tank 110, a transfer pipe 114 coupled in flow communication with pump 112, a manifold 116 coupled in flow communication with transfer pipe 114, a plurality of injection nozzles 118 coupled to and in flow communication with manifold 116, and a return pipe 120 coupled in flow communication between manifold 116 and tank 110.

In one embodiment, tank 110 is sized to store between approximately 20 mass pounds (lbm) and approximately 100 lbm of working fluid. In the exemplary embodiment, tank 110 is an approximately spherically-shaped tank that is sized to store between approximately 28 mass pounds (lbm) and approximately 98 mass pounds (lbm) of working fluid, and water is utilized as the working fluid. Optionally, a fluid other than water may be utilized as the working fluid. Tank 110 is positioned and/or coupled within a core cowl space 122 to facilitate maintaining the working fluid stored within tank 110 at a desired operational temperature. In the exemplary embodiment, tank 110 is positioned proximate to core gas turbine engine 13 at a location that has an operational air temperature that is sufficient to maintain the working fluid stored within tank 110 at a predetermined operational temperature without any additional cooling systems being utilized. As a result, during operation, the air channeled through cowl space 122 is utilized to convectively cool the working fluid stored within tank 110.

Pump 112 includes an inlet, or suction side 130 that is coupled in flow communication with tank 110, and an outlet, or discharge side 132, that is coupled in flow communication with transfer pipe 114. In the exemplary embodiment, pump 112 is sized to channel a desired quantity of flow through transfer pipe 114.

Transfer pipe 114 includes a first end 140, a second end 142, and a substantially hollow body 144 extending therebetween. First end 140 is coupled to pump discharge side 132, and second end 142 is coupled to manifold 116. Moreover, transfer pipe 114 is coupled to gas turbine engine 10 such that body 144 extends radially inwardly through a high-pressure turbine nozzle vane assembly 146. Depending on the engine configuration, optionally the supply tank 110, the pump 112, and the transfer pipe 114, and the return pipe 120 can be repositioned to more conveniently supply the manifold 116. More specifically, transfer pipe 114 extends through turbine nozzle vane assembly 146 such that transfer pipe second end 142 is positioned within a cavity 148 that is defined radially inwardly from turbine nozzle vane assembly 146, and radially outwardly of second rotor shaft 32. As such, transfer pipe 114 extends through turbine nozzle vane assembly 146 such that transfer pipe second end 142, and thus manifold 116, are each positioned radially inwardly from both combustor 16 and turbine nozzle vane assembly 146, and are each positioned radially outwardly from an off-take duct assembly 150. In the exemplary embodiment, at least a portion of transfer pipe 114 is insulated utilizing an insulating material 152 to facilitate maintaining the working fluid channeled therethrough at a predetermined operating temperature.

In the exemplary embodiment, manifold 116 is toroidal-shaped and includes an inlet 160 that is coupled to transfer pipe second end 142, and an outlet 162 that is coupled to return pipe 120. In the exemplary embodiment, toroidal-shaped is defined as a substantially circular hollow structure, i.e. doughnut shaped, that includes a radial cavity 166 defined therein such that the working fluid channeled through manifold 116 is channeled both in a first radial direction 168 and a second opposite radial direction 170 generally towards return pipe 120.

Cooling system 100 also includes a plurality of injection nozzles 118 that are approximately equidistantly spaced around an external surface of manifold 116. In the exemplary embodiment, manifold 116 includes a plurality of openings 180 extending therethrough along an axially forward surface 182 of manifold 116, and an injection nozzle 118 is threadably coupled within each respective opening 180. In another embodiment, each injection nozzle 118 is coupled to manifold 116 using a welding or brazing procedure, for example. In a further embodiment, cooling system 100 does not include nozzles 118, rather openings 180 are selectively sized such that the working fluid is channeled therethrough in a predetermined quantity. Each nozzle 118 includes an opening 184 that is sized to enable a sufficient quantity of working fluid to be discharged through nozzle 118 and into the cooling air airstream to generate a water/air ratio that is between approximately 0.022 and approximately 0.025. In the exemplary embodiment, each opening 184 is sized to generate a water/air ratio that is between approximately 0.0235 and approximately 0.0236.

Return pipe 120 includes an inlet 190 that is coupled in flow communication with manifold outlet 162, and an outlet 192 that is coupled in flow communication with tank 110. In the exemplary embodiment, return pipe 120 facilitates channeling any unused portion of the working fluid back to tank 110.

Cooling system 100 also includes a control system 200 that is configured to activate pump 112. In the exemplary embodiment, control system 200 is a computer that includes an algorithm configured to energize and/or de-energize pump 112 based on selected inputs. More specifically, and in the exemplary embodiment, control system 200 includes at least one temperature sensor 210 and at least one mass flow sensor 212 that are utilized to monitor the temperature and flow rate of the airflow, respectively, channeled to high-pressure turbine 18, and based on that temperature or flow rate either energize or de-energize pump 112.

Figure 4:
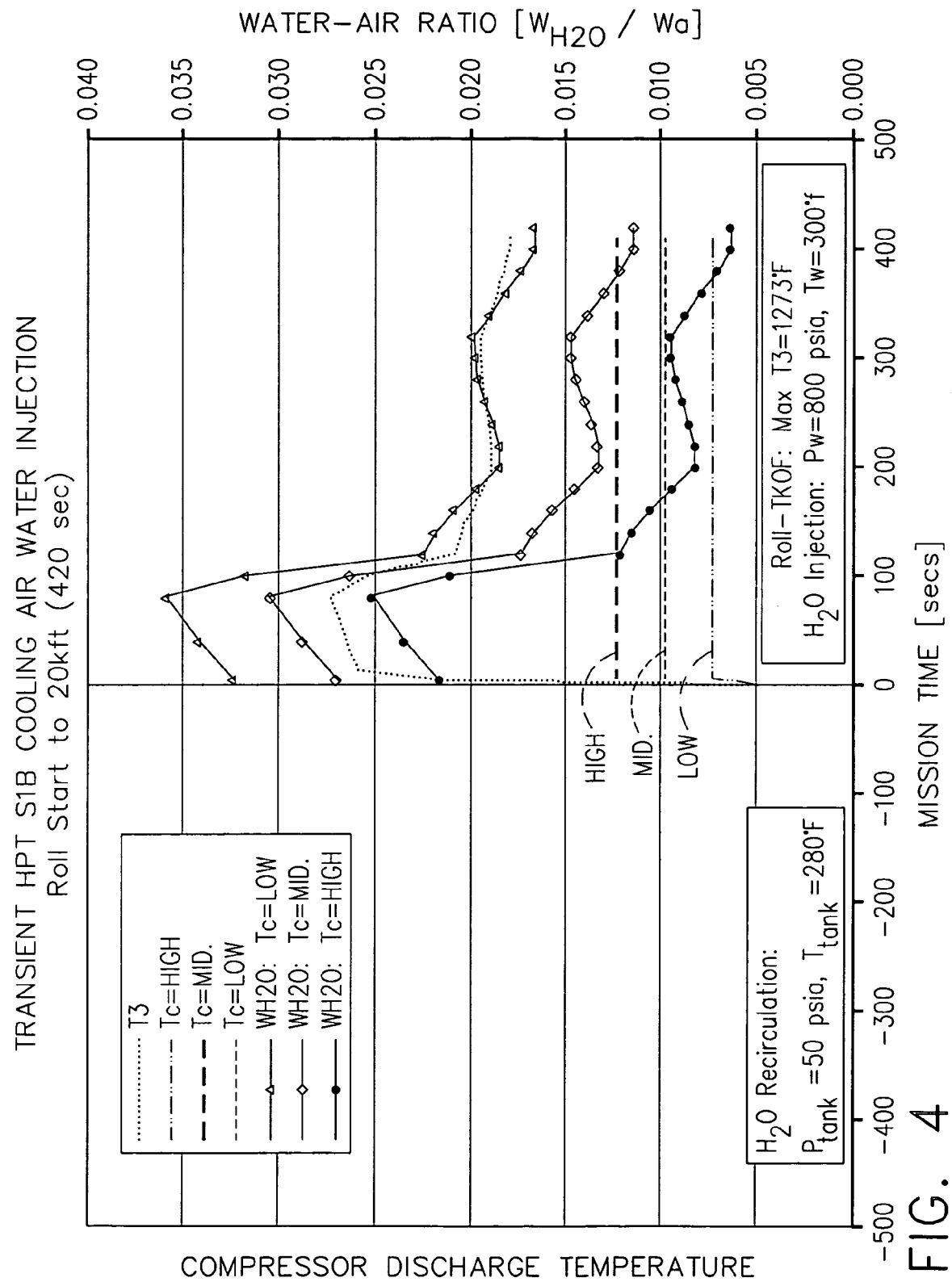
FIG. 4 is a graphical model illustrating the cooling system shown in FIGS. 2 and 3 during normal operation.

FIG. 4 is a graphical illustration of system 100 during normal operation. More specifically, FIG. 4 is a graphical model illustrating system 100 operating to facilitate reducing the temperature of the cooling air flow entering high pressure turbine 18. As shown in FIG. 4, at the start of the takeoff sequence, relatively high-pressure working fluid, e.g. water, is injected from tank 110 through manifold 116 on a controlled schedule into the high-temperature turbine cooling air flow to maintain a constant resulting turbine cooling supply temperature ($T_c$). Three different cases are shown in FIG. 4 utilizing system 100 to facilitate achieving target temperature reduction approximately 175° F., 150° F., and 125°, respectively, of the airflow supply temperatures entering turbine 19, from the supply airflow temperature (T3).

Figure 5:
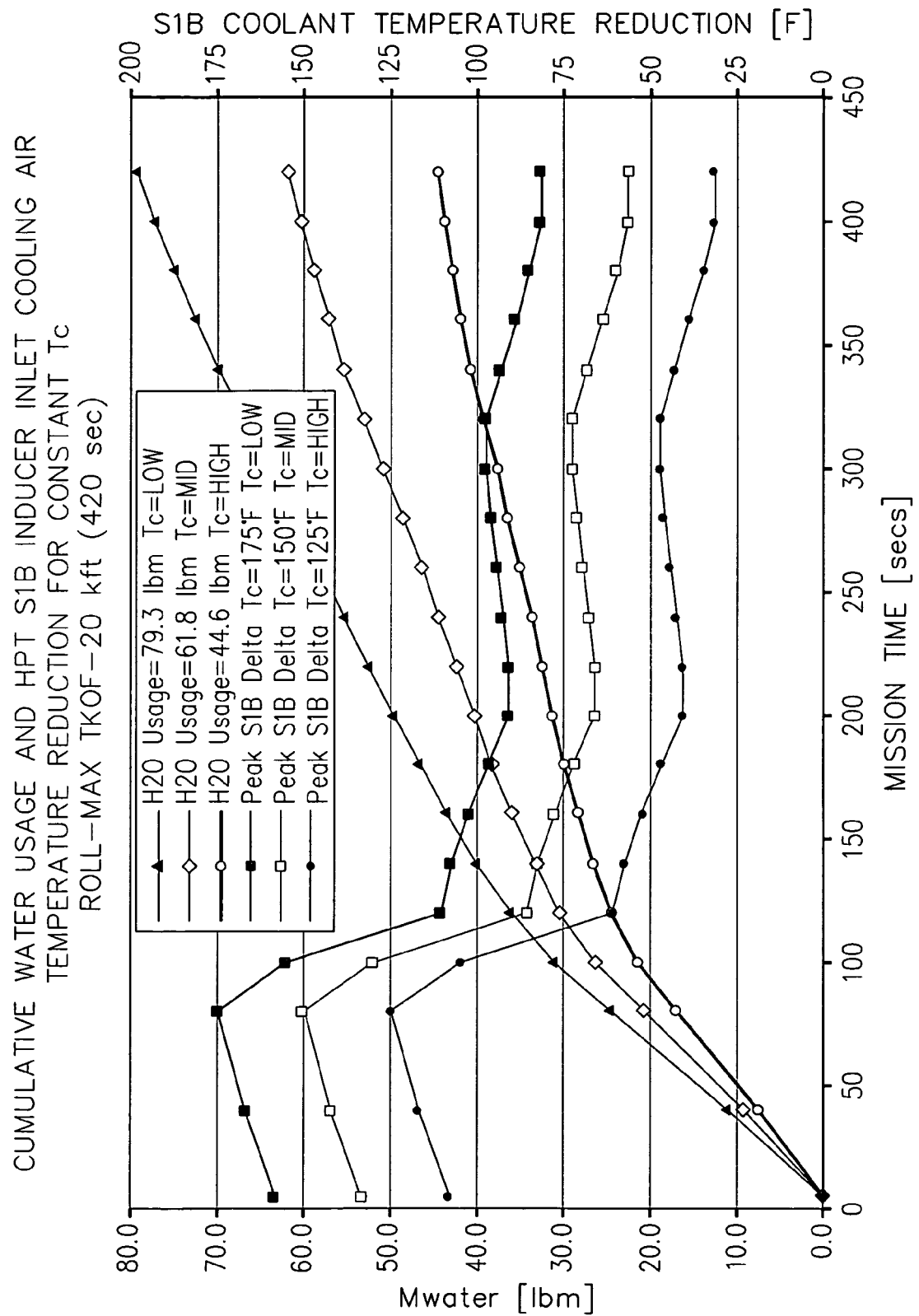
FIG. 5 is another graphical model illustrating the cooling system shown in FIGS. 2 and 3 during normal operation.

FIG. 5 is a graphical model illustrating the cumulative working fluid usage over time vs. the turbine cooling air temperature reduction achieved. As shown in FIG. 5, at the start of the takeoff sequence, relatively high-pressure working fluid, e.g. water, is injected from tank 110 through manifold 116 on a controlled schedule into the high-temperature turbine cooling air flow to maintain a constant resulting turbine cooling supply temperature ($T_c$). Three different cases are shown in FIG. 4 utilizing system 100 to facilitate achieving target temperature reduction approximately 175° F., 150° F., and 125°,respectively, of the airflow supply temperatures entering turbine 19, from the supply airflow temperature (T3). As a result, system 100 utilizes approximately 79.3 lbm to reduce the airflow temperature approximately 175° F., approximately 61.8 lbm to reduce the airflow temperature approximately 150° F., and approximately 44.6 lbm to facilitate reducing the airflow temperature approximately 125°.

Figure 6:
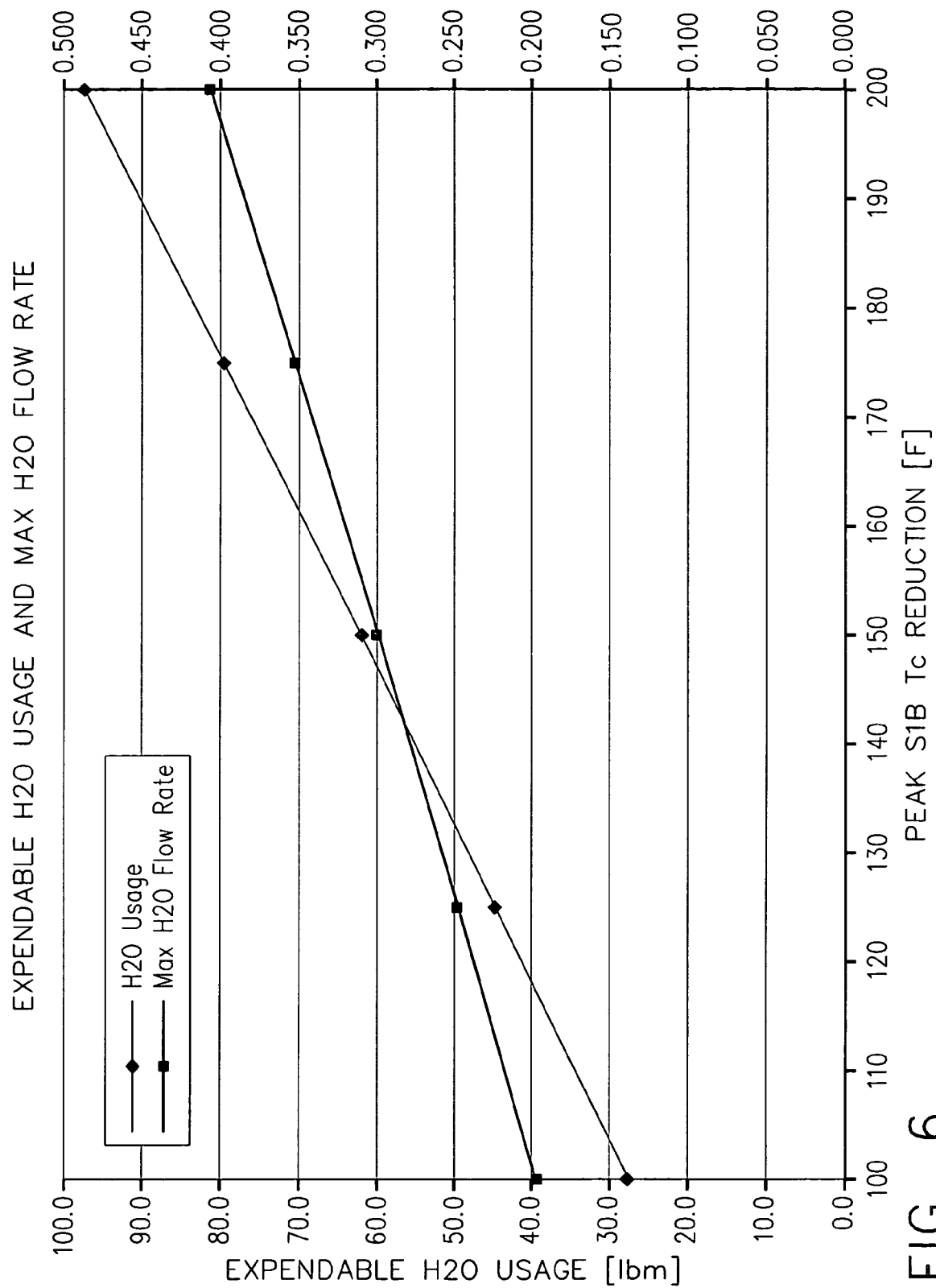
FIG. 6 is a graphical model illustrating the quantity of working fluid stored in a tank versus the desired peak turbine cooling air temperature reduction.

FIG. 6 is a graphical model illustrating the quantity of working fluid stored in tank 110 versus the desired peak turbine cooling air temperature reduction for the turbine operating range of 100° F. to 200°. As shown, between approximately 28 lbm and 98 lbm of expendable working fluid are used to achieve the 100° F. and 200° F. reductions, respectively. An estimate of total system weight was made for the case of a 150° F. target turbine cooling air temperature reduction. In the exemplary embodiment, the total weight with 61.8 of expendable working fluid loaded is approximately 157 lbm, and the working fluid expended is approximately 95.2 lbm. As a result, the cumulative weight of system 100 including the working fluid, is a relatively small residual weight penalty to carry at cruise, and is also significantly smaller than the weight required to utilize at least one known air-air heat exchanger designed to achieve the same temperature reductions that are achieved utilizing system 100.

In the exemplary embodiment, the temperatures, flowrates, and working fluid usage rates achieved utilizing system 100 are based on the cooling system being utilized in the exemplary gas turbine engine 10. As such, the reductions in airflow temperatures, the working fluid flowrates and usage may vary from the exemplary embodiment, based on the engine that system 100 is coupled to.

The above-described airflow cooling system includes a working fluid storage tank and a pump that is placed in a selected core cowl space near the plane of the high-pressure turbine stage 1 vane inlet. During operation, the pump supplies the working fluid, e.g. water, to a relatively small diameter, insulated, transfer pipe traversing a vane internal cooling cavity to a toroidal, i.e. ring, manifold that is positioned near the entrance to the off-take duct feeding the high-pressure turbine inducer. The manifold is fitted with a plurality of mini-nozzles connected to the off-take duct. The manifold also includes a return tube for recirculation of the water back to the storage tank during engine startup, idle, taxi, and hold before initiation of the takeoff roll.

In use, convection cooling in the core cowl cavity facilitates maintaining the water temperature at a predetermined temperature during predetermined flight conditions. For example, at the start of the takeoff sequence, and continuously to a selected mid-level climb point, the recirculation line is closed, valves in the transfer line are actuated, and high-pressure water is injected on a controlled schedule from the tank, into the high-temperature turbine cooling air flow, utilizing the toroidal manifold, to facilitate maintaining a relatively constant turbine cooling supply temperature. When the aircraft has reached a specified altitude at which T3 has dropped to an acceptable level, the system is de-energized and the residual water is recirculated to the storage tank and/or vented to atmosphere.

As a result, the thermodynamic process of heating the sub-cooled water, absorbing the latent heat of fusion, and then heating the water vapor to the final air-water mixture temperature provides a significant reduction in the cooling air temperature. The water/air ratio is relatively small—in the range of approximately 0.0235 to approximately 0.0236, thus providing significant cooling air temperature reduction using a system that has less weight than other known cooling systems.

Exemplary embodiments of a cooling system are described above in detail. The cooling system is not limited to the specific embodiments described herein, but rather, components of the system may be utilized independently and separately from other components described herein. Specifically, the cooling system described herein may be utilized on any known gas turbine engine.

While the invention has been described in terms of various specific embodiments, those skilled in the art will recognize that the invention can be practiced with modification within the spirit and scope of the claims.

What is claimed is:

1. A cooling system for a gas turbine engine including a compressor, a combustor, a high-pressure turbine, and a high-pressure turbine cooling air supply duct, coupled together in serial flow arrangement, said cooling system comprising: a storage tank; a working fluid stored within the storage tank; a manifold coupled in flow communication between the combustor and the high-pressure turbine, said cooling system configured to discharge the working fluid from said storage tank into the high-pressure turbine cooling air supply duct using said manifold to facilitate reducing an operating temperature of the compressed airflow channeled to the high pressure turbine and a return conduit comprising a first end coupled to an outlet of said manifold and a second end coupled to an inlet of said storage tank, said return conduit configured to channel an unused portion of said working fluid to the inlet of said storage tank.

2. A cooling system in accordance with claim 1 wherein said storage tank, said manifold, and the gas turbine engine are installed on an aircraft.

3. A cooling system in accordance with claim 1 wherein said manifold comprises a toroidal manifold.

4. A cooling system in accordance with claim 1 wherein the gas turbine engine includes an off-take duct and a high-pressure turbine inducer, said manifold positioned proximate to an entrance of the off-take duct feeding the high-pressure turbine inducer.

5. A cooling system in accordance with claim 1 further comprising a pump coupled in flow communication with said storage tank and said manifold, said pump selectively energized to channel the working fluid from said storage tank into said manifold.

6. A cooling system in accordance with claim 5 wherein said storage tank and said pump are each placed in a selected core cowl space proximate to a plane of a high-pressure turbine vane inlet to facilitate maintaining the working fluid at a predetermined operational temperature.

7. A cooling system in accordance with claim 1 further comprising a plurality of nozzles coupled to said manifold, said nozzles configured to inject a predetermined quantity of working fluid into the airflow stream entering the high-pressure turbine.

8. A gas turbine engine assembly comprising:
a core gas turbine engine comprising
 a compressor;
 a combustor downstream from said compressor; and
 a high-pressure turbine downstream from said combustor; and
a cooling system comprising
 a storage tank;
 a working fluid stored within said storage tank;
 a manifold coupled to a duct that supplies cooling air to the high pressure turbine, discharging the fluid into the turbine cooling air supply duct, and thereby reducing the temperature of the compressed cooling airflow channeled to the high pressure turbine; and
a return conduit comprising a first end coupled to an outlet of said manifold and a second end coupled to an inlet of said storage tank, said return conduit configured to channel an unused portion of said working fluid to the inlet of said storage tank.

9. A gas turbine engine assembly in accordance with claim 8 wherein said cooling system and said core gas turbine engine are installed on an aircraft.

10. A gas turbine engine assembly in accordance with claim 8 wherein said manifold comprises a toroidal manifold.

11. A gas turbine engine assembly in accordance with claim 8 wherein said core gas turbine engine further comprises an off-take duct and a high-pressure turbine inducer, said manifold positioned proximate to an entrance of said off-take duct feeding said high-pressure turbine inducer.

12. A gas turbine engine assembly in accordance with claim 8 further comprising a pump coupled in flow communication with said storage tank and said manifold, said pump selectively energized to channel the working fluid from said storage tank into said manifold.

13. A gas turbine engine assembly in accordance with claim 11 wherein said storage tank and said pump are each placed in a selected core cowl space proximate to a plane of a high-pressure turbine vane inlet to facilitate maintaining the working fluid at a predetermined operational temperature.

14. A gas turbine engine assembly in accordance with claim 8 further comprising a plurality of nozzles coupled to said manifold, said nozzles configured to inject a predetermined quantity of working fluid into the airflow stream entering said high-pressure turbine.

* * * * *

UNITED STATES PATENT AND TRADEMARK OFFICE
CERTIFICATE OF CORRECTION

PATENT NO. : 7,607,307 B2 Page 1 of 1
APPLICATION NO. : 11/327623
DATED : October 27, 2009
INVENTOR(S) : Robert Frederick Bergholz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 812 days.

Signed and Sealed this

Twelfth Day of October, 2010

David J. Kappos
*Director of the United States Patent and Trademark Office*